June 2, 1931.  J. JONAS  1,807,846

TRANSFORMER PROTECTIVE DEVICE

Filed Feb. 2, 1929

Inventor
Julius Jonas
By *Alfred H. Dyson*
Attorney

Patented June 2, 1931

1,807,846

UNITED STATES PATENT OFFICE

JULIUS JONAS, OF BADEN, SWITZERLAND, ASSIGNOR TO AKTIENGESELLSCHAFT BROWN BOVERI & CIE., OF BADEN, SWITZERLAND, A JOINT-STOCK COMPANY OF SWITZERLAND

TRANSFORMER PROTECTIVE DEVICE

Application filed February 2, 1929, Serial No. 337,067, and in Germany February 6, 1928.

This invention relates to improvements in electric transformers and, more particularly, to means in connection with the windings of such transformer for detecting or for protecting the same from faults of any nature therein.

Devices for the selective protection of transformers, especially for high tension operation, are in common use. The difference between the energy supplied and the energy withdrawn from a transformer may be obtained by comparison of the primary input current with the secondary output current which currents, apart from normal losses, should be equal if considered with respect to a like number of turns of each winding. Any disturbance in the magnetic circuit or field or in the current will produce a differential current which may be utilized to operate an indicating or protective device. Such faults may occur in either the high or low tension winding but, for numerous obvious reasons, the circuit for operating the fault indicating or protecting device is more advantageously incorporated in the low tension winding which is so arranged that disturbances in the high tension winding are also indicated. The requisites of such protective device are; operation only by transformer faults rather than faults in the exterior system, and rapidity, and certainty of action.

It is, therefore, among the objects of the present invention to provide a selective device for high tension electric transformers which will protect the transformer from continuing disturbances of any nature occurring therein.

Another object of the invention is to provide an arrangement in connection with the low tension winding of a transformer which will also protect the transformer from faults occurring in the high tension winding thereof.

Figure 1:
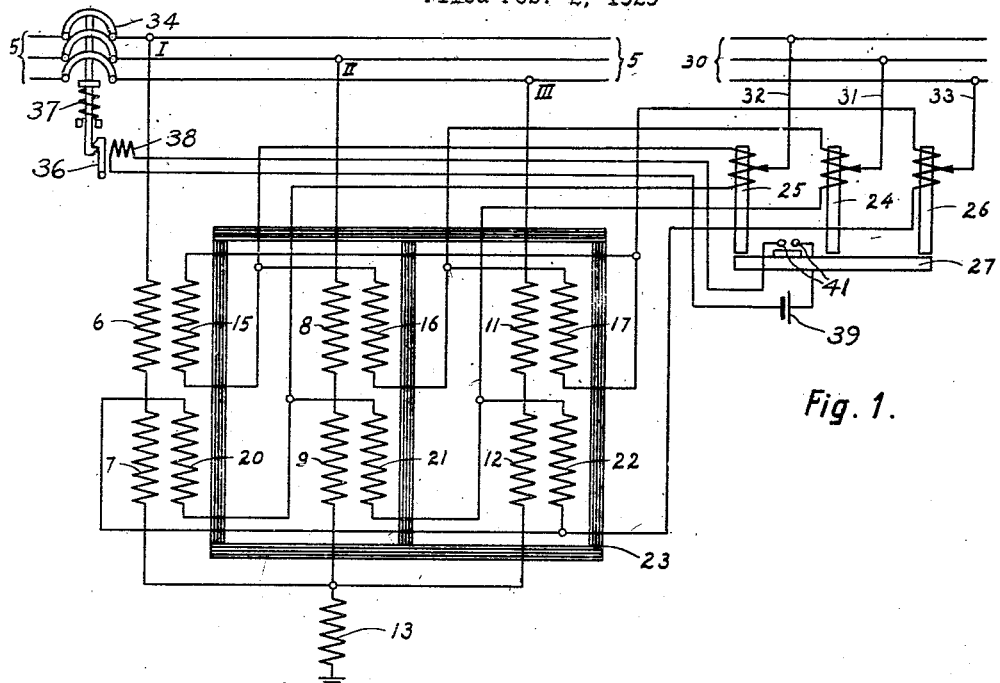
Figure 2:
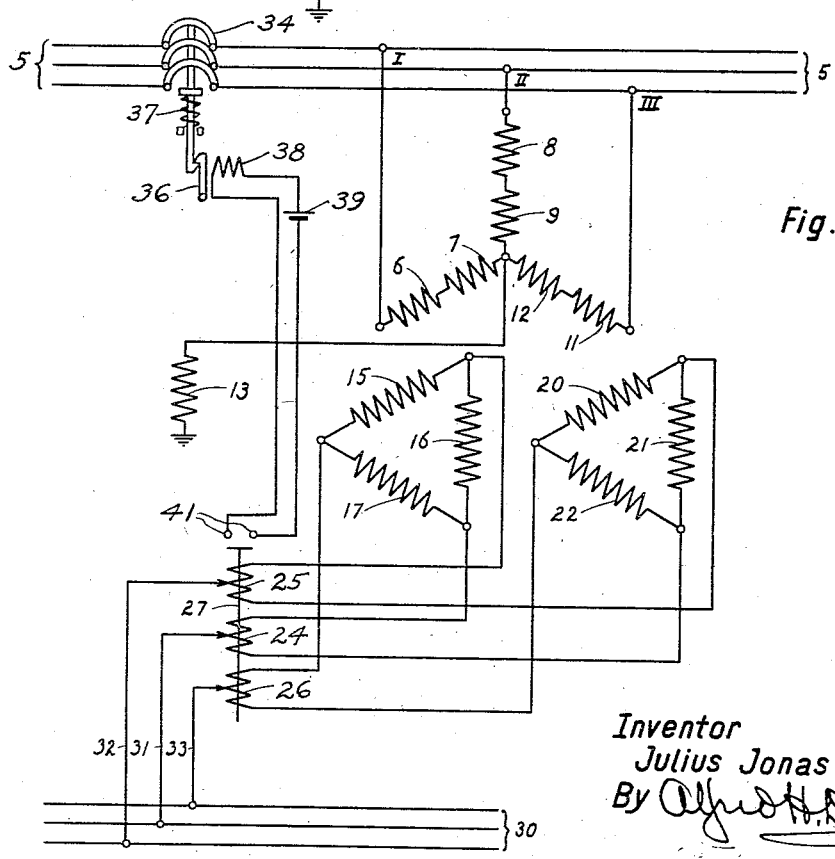

Objects and advantages, other than those above set forth, will be apparent from the following description of the drawings in which:

Figure 1 is a diagrammatic view of the invention illustrating the construction of one embodiment of the invention, and Fig. 2 is a diagrammatic view of one embodiment of the invention showing the connections in a conventional manner.

Referring to the drawings by characters of reference, the reference numeral 5 indicates a three phase supply system having the phases I, II and III to which the primary windings of a transformer are connected. The primary windings are divided into a plurality of portions connected in the usual star connection. Each portion of the primary windings is composed of two series connected coils in such manner that coils 6 and 7, coils 8 and 9 and coils 11 and 12, respectively, form each of the star connected primary winding portions. The primary winding portions are so interrelated and connected that the coils belonging to the same phases are connected in series and all of the phases are connected in star. A choke coil 13 is connected with the star or common point of the primary windings and is grounded.

The secondary winding portions of the transformer are divided into two similar delta connected portions comprising the coils 15, 16, 17 and 20, 21, 22, respectively. The secondary windings and the primary windings are arranged in a side by side relation on a common magnetic core 23, each set of windings occupying one-half of a leg of the core, and are so spaced as to be loosely coupled. Such loose coupling of the windings is advantageous to the functioning of the device so that the reaction of the parallel windings on each other will not equalize the asymmetry occurring in case of a fault and thereby prevent operation of the protective device. The excitation coils 24, 25, 26, having a common armature 27, of a protective relay are connected between corresponding corner points of the two delta connected secondaries or they may be connected with any equipotential points of the secondary windings or three single relays, operated from a common circuit, may be used. The relay coils deliver the output voltage of the secondary to a low-tension circuit 30 through movable contact connection 31, 32 and 33.

In operation, as long as the winding portions are so arranged that the field within the transformer is symmetrical and the current relations remain constant, the relays 24, 25 and 26 will not operate but as soon as any disturbance, such as a short circuit, occurs, the symmetry of the fields is disturbed and a voltage appears in the relay coils which actuate the armature 27 to operate a switch 34 for disconnecting the transformer from the system. The switch 34 is retained in closed position by an armature-latch 36 against the action of a compression spring 37. The latch 36 may be disengaged by energization of a releasing coil 38 supplied from a source of current 39 when the relay armature 27 is moved to bridge a pair of contacts 41.

Instead of having the armature 27 connected directly to a switch, the same may also be actuated by any suitable device arranged between them.

The invention above disclosed has the advantages, in particular, over the prior art devices that no additional transformers of any description are required and that the device operates only in response to a fault occurring in the transformer to which it is connected. The device may further be so constructed and arranged that any desired time lag may be obtained and the time lag may be made dependent on the magnitude of the fault.

Although but one embodiment of the invention has been illustrated and described, it will be understood that various other embodiments are possible, and that various changes may be made without departing from the spirit of the invention or the scope of the claims.

The invention claimed is:

1. In a transformer, a magnetic core, a primary winding, secondary windings, said secondary windings being divided into a plurality of similar delta connected portions, all of said windings being arranged on said core, and means in connection with said secondary windings for disconnecting the transformer upon occurrence of a fault therein.

2. In a transformer, a magnetic core, a primary winding, a plurality of delta connected secondary windings arranged in side by side relation on said core, and a relay having a plurality of coils connected to corresponding points in said secondary windings for making the transformer inoperative upon occurrence of a fault therein.

3. In an arrangement for protecting a transformer from faults occurring therein, the transformer having a core, a primary winding and secondary windings; a plurality of coils connected to corresponding points of the secondary windings for making the transformer inoperative upon occurrence of a fault therein, said coils having a common armature.

4. In an electric current transformer protective system, a magnetic core, a primary winding arranged upon said core, secondary windings arranged on said core in proximity with said primary wndings, a plurality of coils connected to said secondary windings and interconnecting the same, said coils having a common armature, and a switch for connecting and disconnecting the transformer, said switch being operable upon movement of said armature.

In testimony whereof I have hereunto subscribed my name this 22nd day of January, A. D. 1929.

JULIUS JONAS.